United States Patent
Bühler et al.

[11] Patent Number: 5,854,459
[45] Date of Patent: Dec. 29, 1998

[54] METHOD AND DEVICE FOR PROCESSING WORKPIECES BY MEANS OF ELECTRICAL DISCHARGE MACHINING

[75] Inventors: Ernst Bühler, Losone; Hans-Jürg Etter, Verscio; Peter Wehrli, Auressio, all of Switzerland

[73] Assignee: Agie Ltd., Switzerland

[21] Appl. No.: 942,507

[22] Filed: Oct. 2, 1997

[30] Foreign Application Priority Data

Oct. 2, 1996 [DE] Germany ................ 196 40 790.7

[51] Int. Cl.$^6$ ................................. B23H 7/10
[52] U.S. Cl. .................................. 219/69.12
[58] Field of Search .............. 219/69.12, 69.14

[56] References Cited

U.S. PATENT DOCUMENTS

| | | | |
|---|---|---|---|
| 4,243,864 | 1/1981 | Vieau et al. | 219/69.12 |
| 4,762,974 | 8/1988 | Kern | 219/69.12 |
| 4,808,787 | 2/1989 | Futamura | 219/69.14 |
| 5,070,224 | 12/1991 | Topfer et al. | 219/69.12 |
| 5,086,203 | 2/1992 | Kobayashi et al. | 219/69.12 |
| 5,237,145 | 8/1993 | Magara et al. | 219/69.12 |
| 5,243,165 | 9/1993 | Hosaka | 219/69.12 |
| 5,401,931 | 3/1995 | Hori | 219/69.12 |

FOREIGN PATENT DOCUMENTS

| | | | |
|---|---|---|---|
| 63-105821 | 5/1988 | Japan | 219/69.12 |
| 6-114634 | 4/1994 | Japan | 219/69.12 |
| 6-226540 | 8/1994 | Japan | 219/69.12 |

*Primary Examiner*—Geoffrey S. Evans
*Attorney, Agent, or Firm*—Gifford, Krass, Groh, Sprinkle, Patmore, Anderson & Citkowski, P.C.

[57] ABSTRACT

The invention pertains to a method and a device for die sinking and wire-cutting workpieces by means of electrical discharge machining. A machine frame (10) as well as a worktank (9) and a lower guide head (5) form a stationary unit referred to the main axis directions X, Y. The workpiece (2) is immersed in the worktank (9) and moved in the horizontal plane by means of the X/Y main axis drive (14). An upper guide head (4) also forms part of the stationary unit or can be moved by means of a Z drive (16) and/or a U/V drive (15). The lower guide head may also be designed such that it can be vertically moved by means of a lower Z drive (17). This concept is particularly suitable for producing microscopic components by means of electrical discharge machining and as a multielectrode machine that processes workpieces simultaneously or sequentially.

12 Claims, 7 Drawing Sheets

METHOD AND DEVICE FOR PROCESSING WORKPIECES BY MEANS OF ELECTRICAL DISCHARGE MACHINING

I. FIELD OF THE INVENTION

The invention pertains to a method and a device for processing workpieces by means of electrical discharge machining according to the preamble of claim 1 or 9, respectively.

II. DESCRIPTION OF THE RELATED ART

In machine tools for precision-machining workpieces with the aid of a processing tool, e.g., CNC-controlled milling systems, metal-cutting systems, grinding systems, erosion systems, etc., it is extremely laborious to realize the relative movement between the processing tool and the workpiece in exact and reproducible fashion. In this case, one usually utilizes drive systems, e.g., Cartesian drive systems such as Cartesian cross tables, which can be displaced in mutually perpendicular directions in a plane under numerical control. Such drive systems are coupled with the processing tool and/or the workpiece in order to attain the relative movement between the workpiece and the tool which generates the desired processing contour. In this context, we refer to ISO Standard R 841 "Nomenclature des axes et des mouvements pour la commande numerique des machines" which describes many known arrangements of drive systems for machine tools. When using a somewhat complicated drive kinematics, e.g., multi-axis drive kinematics, these known drive systems frequently require a relatively complicated construction of the work space within the immediate vicinity of the workpiece.

One example for a machine tool of this type is a wire electrical discharge machine. In this case, the processing tool that is realized in the form of a wire erosion electrode is moved relative to the workpiece so as to cause an electrical spark discharge between the erosion wire and the workpiece. A contour is cut into the workpiece by means of the erosion wire beginning at a start hole. One example of a known wire electrical discharge machine of this type is illustrated in FIG. 6: this machine contains two wire guide heads 4' and 5' that are arranged at a distance from one another in front and behind a workpiece 2' viewed in the wire advance direction. These wire guide heads guide a wire erosion electrode 1' through the workpiece 2' in the wire transport direction indicated by the arrow. The wire guide heads 4', 5' are respectively situated on the front end of a Z drive 16' and on a lower wire guiding arm 8', both of which are fastened to a machine frame 10', in this case a C frame. The Z drive 16' with the upper guide head 4' protrudes vertically into the work space of the wire electrical discharge machine from the top; the lower carrying arm 8' extends up to the work space through the side wall of a worktank 9' that serves for accommodating a dielectric flushing fluid. The relative movement between the workpiece 2' and the processing electrode 1' which is required for electrical discharge cutting and defines the cutting contour is realized with an X/Y axis drive 14' that is coupled with the worktank 9'. This worktank is rigidly connected to the workpiece 2' via clamping means 11'. When producing conical cuts, a U/V drive 15' that is coupled with the Z drive 16' is additionally provided.

One particular disadvantage of this drive can be seen in the fact that the carrying arm 8' that carries the lower guide head 5' must be sealed in complicated fashion relative to the worktank 9' during the X/Y movements. In addition, these seals impair the accuracy of the machine.

There also exist wire electrical discharge machines in which the lower wire guide arm is realized in the shape of a L and immersed into a worktank from the top. One example of such a system is described in DE-OS 37 38 251 A1. Although this system eliminates the problem of sealing the wire guide arm relative to the worktank, one needs to accept an unnecessarily increased machine dimension, a complicated wire path, a long expansion path under thermal fluctuations and an inferior basic stiffness of the machine design. In this system, as well as the initially mentioned systems, an additional disadvantage can be seen in the fact that the lower wire guide with the guide head and the guide arm is highly exposed, i.e., it occupies much space in the immediate vicinity of the workpiece. Consequently, a significant risk of collisions exists during the processing of the workpiece.

In order to eliminate the above-mentioned sealing problem, the state of the art discloses other concepts that, however, already deviate from the initially mentioned system concept with respect to their processing kinematics:

For example, the prospectus H-189E 9408/1 (FP) (10/1993) "UPH-1 MV-10 Wire Electrical Discharge Machine for Ultraprecision Machining of Hard Metals" by Makino shows a high-precision wire electrical discharge machine. In this case, the workpiece is vertically suspended on a machine frame, and an erosion wire can be horizontally moved between a front wire guide and a rear wire guide. Due to the vertical position of the workpiece, this machine concept is only sensible for small workpieces and short displacement paths. One additional disadvantage of this arrangement can be seen in the fact that both wire guides and the additional means for supplying the discharge current and the dielectric flushing fluid which are integrated into the guide head are immersed in the flushing fluid during the processing and thus subjected to significant chemical wear, e.g., due to corrosion, as well as mechanical wear, e.g., due to workpiece particles that accumulate during the processing and penetrate into the wire guides.

The above-mentioned German Patent No. 37 38 251 A1 also shows a wire electrical discharge machine in which the workpiece is held in place on the bottom of a worktank. The worktank is directly situated on an X/Y cross table that is provided with an opening, through which the lower wire guide extends into the near vicinity of the workpiece. A particular disadvantage of this arrangement is the complex seal required for sealing the lower wire guide relative to the X/Y table.

For reasons of completeness, we also refer to Japanese Kokai Patent Application Nos. Hei 6[1994]-134622 and SHO 63[1988]-216629 which respectively disclose wire electrical discharge machines in which the workpiece remains stationary and the X/Y movements as well as the U/V movements are realized by displacing a lower wire guide and an upper wire guide. The invention is based on the objective of simplifying a method and a device for processing workpieces, in particular, by means of electrical discharge machining, of the initially mentioned type.

III. SUMMARY OF THE INVENTION

In the method for processing workpieces by means of electrical discharge machining, a processing electrode, e.g., a wire electrode or a die sinking electrode, is held inside the work space in at least one guide head, and the workpiece is displaced relative to the processing electrode, wherein the workpiece is arranged within the work space in an essentially horizontal position and moved in the direction of the main X/Y axes. In a device for processing workpieces by electrical discharge machining, one or more processing electrodes are provided for this purpose, wherein a workpiece is moved by an X/Y main axis drive and simultaneously eroded by means of at least one processing electrode. In this case, a machine frame, a worktank for accommodating the work fluid and one or each lower guide head form a stationary unit referred to the main axes. The main X/Y plane is aligned horizontally; in its starting position, the processing electrode or each processing electrode is essentially aligned vertically. Consequently, the workpiece or workpieces situated on a pallet are eroded within the work space in an essentially horizontal position.

In this case, the term "essentially" horizontal position of the workpiece (or pallet) is used because slight alignment errors may occur during the mounting of the workpiece. Naturally, these alignment errors can be corrected in conventional fashion. In addition, the term "essentially" vertical position of the processing electrode is used because the aforementioned mounting errors can be corrected by means of slight corrective measures which, however, cause a change in the angular position of the processing electrode. The term "essentially" vertical position of the processing electrode refers to its starting position, e.g., when producing a cylindrical cut by means of wire electrical discharge machining. For reasons of completeness, it should also be mentioned that the aforementioned corrective measures frequently pertain to very small deviations from the vertical line. However, small to very large deviations may occur, e.g., when producing conical cuts.

The terms "above" or "underneath" as well as "upper" or "lower" are used for reasons of better intelligibility. These terms refer to conventional machine tools, e.g., in accordance with German Patent No. 37 38 251 A1, as well as workpieces that are arranged horizontally.

According to the concept of the invention, the workpieces or a pallet with workpieces is coupled with the main axis drive via suitable clamping means and held within the work space of the machine tool from the top. This work space is, for example, laterally limited by a worktank for accommodating the rinsing fluid. Consequently, means for sealing the moving sections relative to the worktank wall during the X/Y movements of the workpiece are eliminated. Due to this measure, the wear is reduced, and a superior accuracy of the X/Y movements is attained due to the elimination of friction as well as the favorable arrangement of the main axis drive. In addition, the workpiece is advantageously suspended in such a way that the workpiece is at least freely accessible from the bottom and from the top. This measure improves the view of the work space and significantly simplifies its maintenance.

The method and the device according to the invention also provide the following advantages:

the fact that the workpiece is directly coupled to the main axis drive, i.e., without long transmission paths, results in a short frictional connection between the processing tool and the workpiece, i.e., a high mechanical stiffness and consequently a highly accurate processing, short and, if so required, symmetric expansion paths, i.e., a thermally compensating behavior, as well as short current paths for a superior pulse transmission to the spark gap and consequently a simplified installation of the power supply strips. Due to these measures, the concept according to the invention is particularly suitable for use in high-speed electrical discharge machining systems because one or more generators can be arranged in the immediate vicinity, e.g., above or underneath the work space of the system, such that long current supply lines which are associated with high losses are eliminated;

the essentially free access to the workpiece makes it possible to implement automation measures, e.g., the automation of the worktank, the incorporation of robots into production or transfer sections provided with palleting systems;

a fixed machining point due to the workpiece position is attained according to the invention, i.e., the machining of the workpiece can always be monitored. The operator is able to always maintain the operating point in the center of his field of vision. In addition, it is easily possible to realize the monitoring with automatic monitoring means, and the workpiece position according to the invention and the essentially free access to the work space make it possible to easily remove pieces that fall out of the workpiece to be machined from the work space. This is particularly advantageous in the field of microscopic-scale machining.

It is preferred that the upper guide head or heads also forms part of the stationary unit. Alternatively, the height of the upper guide head or heads and/or the lower guide head or heads can be adjusted via a common or individual Z drive; and/or the upper guide head or heads can be moved via a common or individual U/V drive and is, if so required, connected to the stationary unit.

Consequently, the device according to the invention has a drive kinematics unit with at least five axes in order to realize the relative movement between the processing electrode and the workpiece, i.e., a number of processing geometries are possible. In this case, the entire drive kinematics unit is preferably arranged within the upper region of the work space, above the workpiece and outside of a possibly provided worktank, i.e., the work space remains easily accessible and viewable. In addition, the kinematic components are protected from intense wear and soiling.

Decisive advantages are attained due to the arrangement of an upper and a lower Z drive for adjusting the height of the corresponding guide heads: when producing bores by means of wire electrical discharge machining, the drilling speed is doubled if an upper and a lower electrode are simultaneously utilized. In addition, the bore becomes much more accurate because both electrodes only need to be half as long as one individual electrode, i.e., the breakthrough takes place in the interior of the workpiece. This is particularly important for microscopic bores that are limited with respect to the aspect ratio, i.e., the ratio between length and diameter. This aspect ratio can also be nearly doubled.

Additional advantages are attained for the die sinking with one upper and one lower die sinking electrode. The two-sided processing of a workpiece without remounting results in an additional time reduction as well as a significant improvement with respect to the precision because remounting errors are entirely eliminated.

When cutting by means of wire electrical discharge machining with upper and lower guide heads that can be moved in the Z direction, the vertical contours of uneven or differently high workpieces can be easily compensated. This measure also results in a higher metal removing capacity and/or superior precision.

Due to these advantages, the system concept according to the invention is particularly advantageous for processing workpieces by means of electrical discharge machining. According to one preferred variation of a method and a device for processing a workpiece by means of electrical discharge machining, it is proposed that the processing electrode consist of an erosion wire that is guided in an upper guide head—arranged in front of the workpiece viewed in the wire advance direction—and a lower guide head—arranged behind the workpiece viewed in the wire advance direction. In this case, the upper and the lower guide head are arranged symmetrically and situated essentially vertical on top of one another. The erosion wire is guided through the work space essentially vertical between the upper and the lower guide head.

The symmetric vertical alignment of the guide heads provides the advantage that the cantilever guide arms of conventional systems are no longer required. This increases the stiffness of the wire guidance in comparison to conventional systems and advantageously results in a shorter, essentially vertical wire path. Consequently, the erosion wire is deformed less intensely and subjected to lower stresses, i.e., the safety and precision of the wire transport are favorably influenced.

According to a preferred variation of such an electrical discharge machine, the upper guide head is preferably coupled to a U/V drive for realizing the Cartesian adjustment of the upper guide head relative to the lower guide head. According to this variation, the lower guide head is arranged stationarily and rigidly connected to the machine frame. Only the upper guide head carries out a slight movement in the U/V direction in order to produce conical cuts. Consequently, the erosion wire is advantageously subjected to particularly low stresses; it merely needs to follow the slight U/V movement of the upper guide head. The upper guide head is preferably also coupled to the Z drive that serves for realizing the height adjustment. In this case, the Cartesian U/V drive is intermediately arranged in front or behind the Z drive. Due to this measure, the entire drive arrangement of the electrical discharge machine is compactly combined and moved out of the work space. Despite the complicated kinematic unit with 5 axes, the work space remains easily accessible and viewable. This applies, in particular, to the frame construction of the main axis drive described below, in which the frame-shaped main axis drive is accommodated in a housing box, onto which the U/V drive is attached such that it can be linearly displaced.

A wire electrical discharge machine with a particularly high mechanical stiffness is advantageously realized if the machine frame, the optional worktank and the lower guide head form a rigidly connected machine unit that is arranged stationary with respect to the main axis drive. The X/Y movement is exclusively realized by the main axis drive that is coupled with the workpiece and connected to the unit consisting of the machine frame, the optional worktank and the lower wire guide. The upper guide head is preferably connected to the stationary machine unit rigidly or via the Z drive and/or the U/V drive.

In a preferred wire electrical discharge machine, the wire-shaped processing electrode or electrodes essentially extends vertically through a worktank and the corresponding lower guide head. In this case, the lower guide head surrounds the assigned wire-shaped processing electrode so tightly that the drainage of a dielectric from the container is either prevented or takes place in controlled fashion.

In a particularly preferred wire electrical discharge machine, several wire-shaped processing electrodes are provided with several upper guide heads or several lower guide heads, respectively. In this case, the wire-shaped processing electrodes are respectively spaced apart and essentially aligned vertically, such that several identical cutting contours are simultaneously eroded. Several wire-shaped electrodes of different quality and/or different diameter are preferably arranged in several upper guide heads. One respective processing electrode is selected and positioned above an assigned lower guide head by means of the assigned Z drive and/or U/V drive. If several lower guide heads are provided, the workpiece is moved by the X/Y main axis drive such that the starting point of the contour to be produced concurs with the selected lower guide head. In addition, the wire-shaped processing electrode is automatically threaded and automatically severed after the processing is completed.

In particularly preferred die sinking electrical discharge machine, several die sinking electrodes with several upper guide heads and/or several die sinking electrodes with several lower guide heads are provided. In this case, the die sinking electrodes are spaced apart and essentially aligned vertically, such that several identical die sinking contours are simultaneously eroded. It is advantageous to provide several die sinking electrodes of different quality and/or different diameter and/or different shape in several upper guide heads and/or several lower guide heads. One selected die sinking electrode is positioned at the starting point of the contour to be produced by means of the assigned Z drive and/or the U/V drive and/or the main axis drive. These drives make it possible to erode die sinking contours or start holes. In a particularly preferred variation, the start holes are simultaneously eroded from the top with a selected die sinking electrode arranged in an upper guide head and from the bottom with a selected die sinking electrode arranged in a lower guide head.

In the near future, mass production methods that employ electrical discharge machines will be utilized for microscopic components that require start holes, wire cutting processes and two-sided die sinking erosion processes. Multielectrode systems of the aforementioned type multiply the production capacity and the flexibility. Since manipulation means, e.g., vacuum pipettes, may also be arranged on the aforementioned upper and lower Z drives, such systems are particularly suitable for the automated mass production of microscopic components. In a preferred additional development of the system concept according to the invention, the main axis drive according to the invention is open on the inside or is realized in the form of a frame, such that the tool guidance extends into the work space from the top through the main axis drive, originating, e.g., from a machine frame. In one particularly preferred and compact embodiment of the main axis drive according to the invention, the main axis drive is realized in the form of a frame and is open, when viewed in the electrode advance direction. The main axis drive is provided with a first X frame that can be displaced in the direction of the X main axis, while a second Y frame that can be displaced in the direction of the Y main axis is guided inside of the aforementioned X frame. The first X frame is preferably guided in displaceable fashion directly on the box-shaped machine frame. The workpiece to be machined or a pallet of workpieces is fastened to the Y frame via suitable clamping means. In this case, the cantilever length between the workpiece and the main axis drive is advantageously reduced to a minimum, i.e., the main axis drive has a high stiffness and the load transmission can be done with high dynamic quality. If the tool guidance of the processing electrode additionally protrudes into the frame-shaped main axis drive according to the invention from the top, the main axis drive and the processing electrode together form a compact unit that is protected from external influences. For example, an upper Z drive and/or a lower Z drive carries out the movement in the Z direction through the frame opening of the frame-shaped X/Y main axis drive.

In this frame-shaped design of the main axis drive, several processing electrodes are preferably arranged adjacent to one another and protrude into the frame-shaped main axis drive. In this case, several processing electrodes of the same type or different types are arranged on the machine frame of the machine tool in modular fashion. These processing electrodes and the guide heads can be easily exchanged or replaced with other tools. This modular concept is particularly suitable for electrical discharge machines in which—as described previously—several wire or die sinking electrodes of different types or a combination of wire and die sinking electrodes are arranged as described above in order to machine one or more workpieces suspended in the work space. This machine concept is also suitable for a so-called multi-wire system that serves for the erosive cutting of one or more workpieces. In this case, several wire guidances are arranged adjacent to one another. Due to this measure, several contours can be produced simultaneously or successively with different types of erosion wires. In this respect, the machine concept according to the invention is particularly advantageous because the main X/Y movements are carried out by the workpiece, and the wire guidances carry out, if at all, only slight movements, e.g., in the U/V direction when producing conical cuts.

One additional advantage of the present invention can be seen in the fact that the preferably box-shaped machine frame provides an electric shielding effect against interfering radiation. This is particularly advantageous for processing tools that operate with a high-frequency voltage, e.g., wire or die sinking electrodes in electrical discharge machines. In this case, a complicated cabin shielding that usually surrounds the entire system can be eliminated.

As mentioned previously, electrical discharge machining is usually carried out in a bath consisting of a dielectric fluid that serves for rinsing the gap. According to one preferred variation, the electrical discharge machine according to the invention comprises a worktank for accommodating the fluid. This container can be vertically displaced, wherein a column that carries the lower guide head extends through the bottom of the worktank. In this variation, the automation of the worktank movement, i.e., the automatic lowering of the worktank, can be realized very easily without having to empty the worktank. As mentioned previously, the lower guide head usually does not carry out any movements, i.e., this column can be sealed relative to the bottom of the worktank with a simple, conventional seal, e.g., an expansion bellows seal. Naturally, this column may also be provided with a drive, e.g., a Z drive, that is sealed relative to the worktank by the aforementioned seal.

Alternatively, it is possible to provide a worktank with a stationary bottom for accommodating the fluid. In this case, only the side walls of the worktank can be vertically lowered, displaced or pivoted. According to this variation, the lower guide head is rigidly connected to the worktank bottom. It is particularly advantageous to arrange the guide head so low that it is integrated into the worktank bottom. A wire guide head that is arranged this low reduces the possible risk of collisions with the workpiece and also protects the additional means provided in the guide head, e.g., for supplying the discharge current and the flushing fluid, from the work fluid.

In one additional preferred variation, a box-shaped machine frame in the vicinity of the workpiece is realized in the form of a worktank for accommodating the work fluid.

BRIEF DESCRIPTION OF THE DRAWING

Additional advantages of the invention are disclosed in the following description of preferred embodiments. The description refers to the enclosed schematic figures. The figures show.

DETAILED DESCRIPTION OF THE PREFERRED EMBODIMENTS

The following description of the invention pertains to a wire electrical discharge machine. However, the invention is not limited to such wire electrical discharge machines because the present invention can be easily utilized for the drive kinematics unit of die sinking electrical discharge machines, in which a processing electrode carries out a controlled movement relative to the workpiece to be machined. In the embodiments described below, corresponding components are identified by identical reference symbols.

Figure 1:
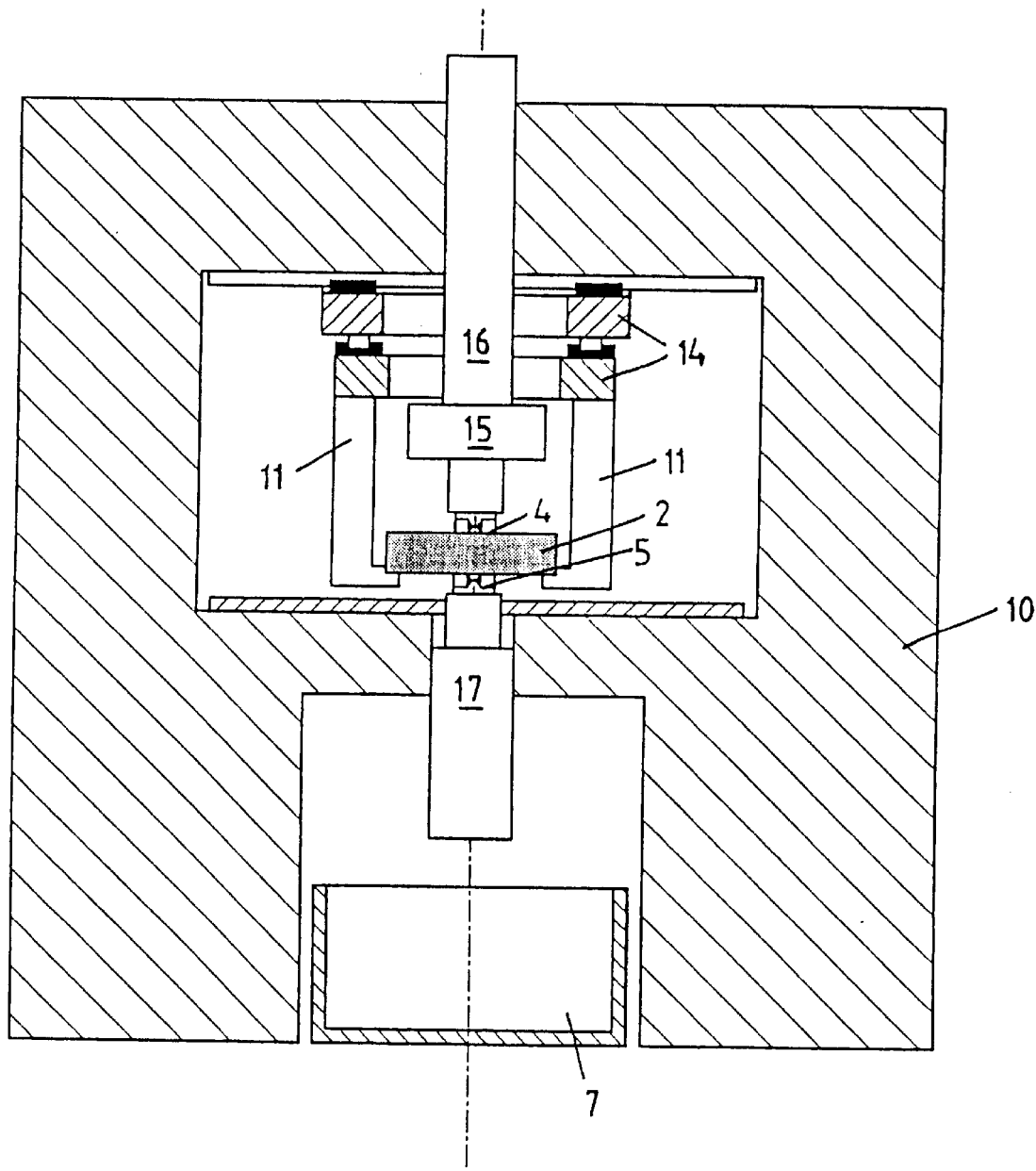
FIG. 1, a longitudinal section through a first variation of a wire electrical discharge machine according to the invention.
Figure 2:
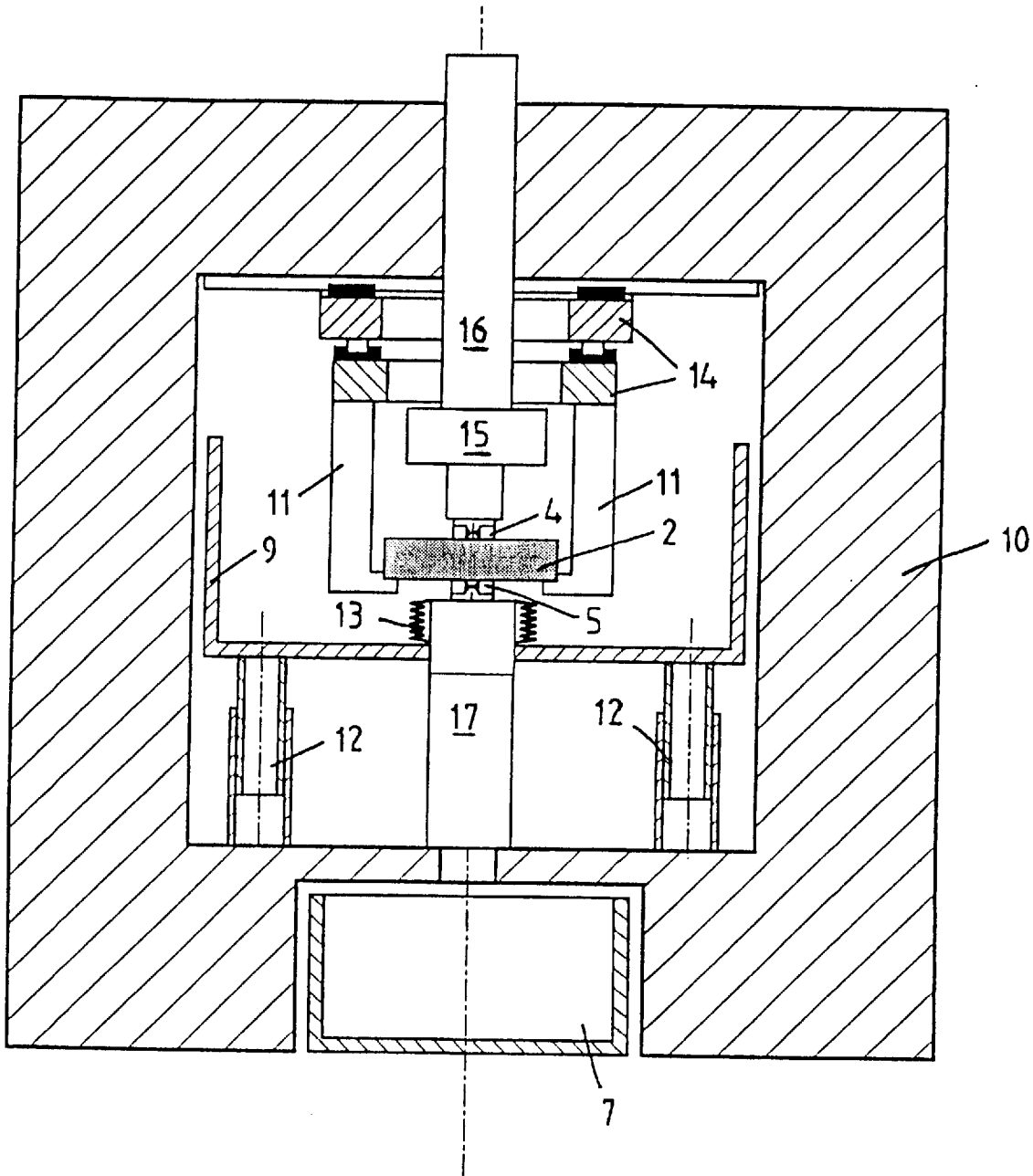
FIG. 2, a longitudinal section through a second variation of a wire electrical discharge machine according to the invention.
Figure 3:
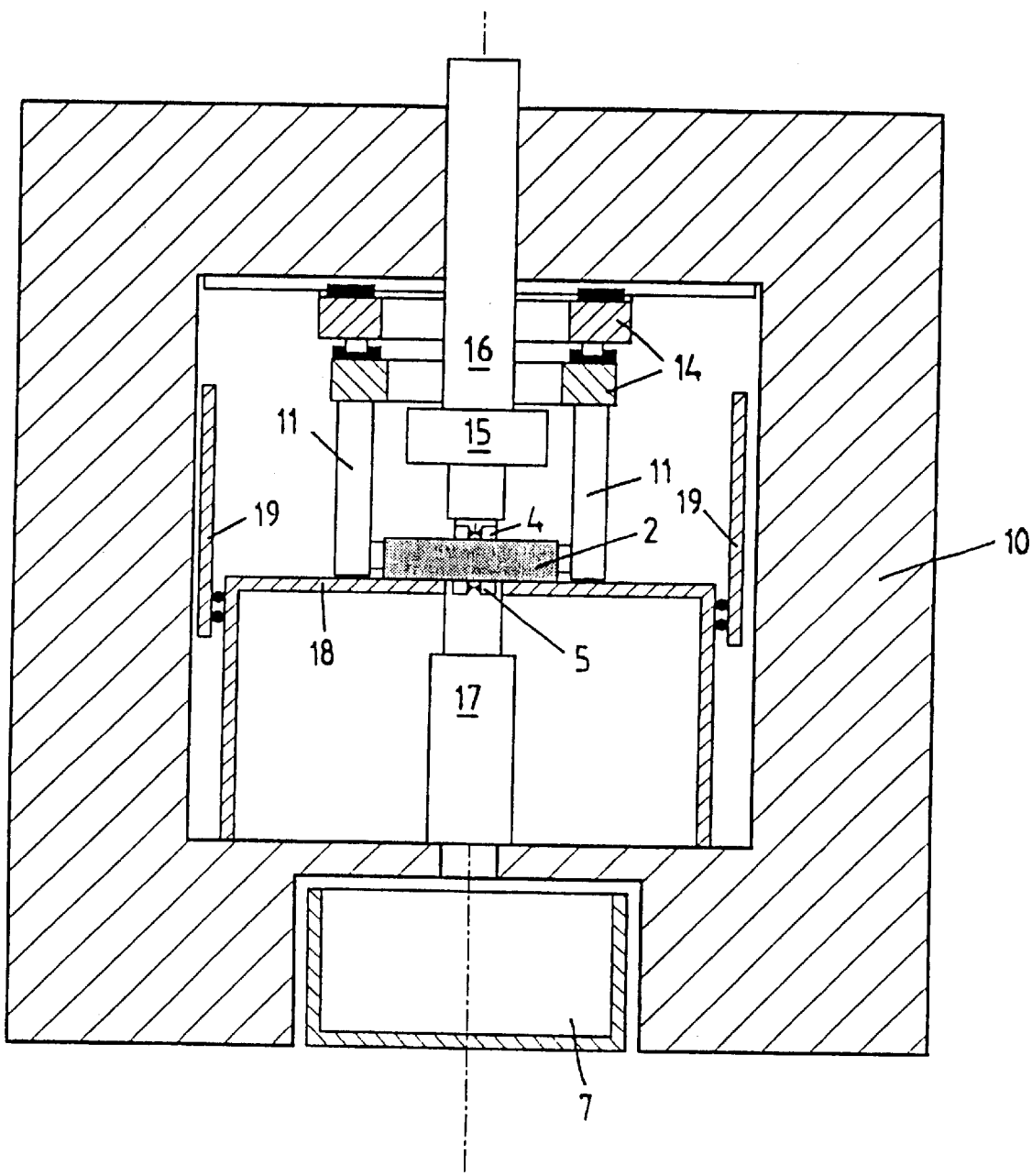
FIG. 3, a longitudinal section through a third variation of a wire electrical discharge machine according to the invention.

FIGS. 1–3 are limited to a purely schematic representation of the essential components in a wire electrical discharge machine which serve for the comprehension of the invention. Basic elements such as the generator and the CNC-control are not shown because they are presumed to be obvious. In addition, the terminology used serves for the easy intelligibility of the description, but does not limit the invention. For example, the terms "upper" or "lower" pertain to wire electrical discharge machines that are arranged vertically.

The wire electrical discharge machining shown in FIG. 1 has a closed machine frame 10, a so-called portal. The open sides of the work space can be closed with sealing covers (not-shown) such that the machine frame 10 and the aforementioned covers form a worktank for accommodating a dielectric flushing fluid. Due to its symmetric design and mechanical stability, the portal frame is preferred for this application. Naturally, the invention may also be advantageously utilized in connection with an open machine frame, a so-called C-frame.

Two guide heads are vertically arranged at a distance from one another within the work space of the wire electrical discharge machine according to FIG. 1. The upper guide head is identified by the reference symbol 4, with the lower guide head being identified by the reference symbol 5. Upper and lower wire guidances with means for supplying the discharge current and the dielectric flushing fluid as well as a wire tensioning device are respectively integrated into the guide heads 4 and 5.

During electrical discharge machining, an erosion wire— not shown—is continuously unwound from a supply reel, vertically guided through the work space between the upper and the lower guide head 4, 5, in this case from top to bottom, and subsequently disposed in a wire collection worktank 7.

The work space of the wire electrical discharge machine, in which a workpiece to be machined is mounted, is situated between the opposing guide heads 4, 5. In the arrangement according to FIG. 1, the workpiece 2 is suspended in the work space of the wire electrical discharge machine from the top via clamping means 11, with the clamping means 11 supported by an X/Y main axis drive 14. The X/Y main axis drive 14 arranged on the side of the upper section of the machine frame 10 which faces the work space generates a movement in the X/Y direction, i.e., the relative movement between the workpiece 2 and the erosion wire which defines the cutting contour. This X/Y main axis drive 14 comprises an upper X slide that can be moved in the X direction along a rail arranged on the inner side of the machine frame 10 as well as a Y slide that can be displaced in the Y direction and is suspended on the X slide. The X slide and the Y slide form a numerically controllable, frame-shaped Cartesian X/Y cross table. The clamping means 11 are rigidly connected to the Y slide of the X/Y main axis drive 14 such that the workpiece 2 is held in the work space from the top and moved relative to the erosion wire in the direction of the X/Y main axes. Both slides of the X/Y main axis drive 14 are provided with a through-opening viewed in the wire unwinding direction. An upper Z drive 16 extends from the machine frame 10 into the work space of the wire electrical discharge machine through this through-opening in order to adjust the height of the upper guide head 4. A corresponding lower Z drive 17 extends into the work space from the bottom of the machine frame 10, with a suitable seal being provided at this location. This lower Z drive carries the lower guide head 5 on its front end.

In order to produce conical cuts, a—schematically illustrated—U/V drive 15 that is coupled with the upper guide head 4 is additionally provided. This U/V drive serves for realizing the Cartesian adjustment of the upper guide head relative to the lower guide head 5 in the U/V direction. In this case, the U/V drive 15 is arranged downstream of the upper Z drive 16. Consequently, the upper guide head 4 is practically suspended on the U slide or V slide of the U/V drive 15 that, in turn, is coupled with the Z drive 16 via the V slide or U slide. The design of this U/V drive 15 corresponds to that of a Cartesian cross carriage.

The wire electrical discharge machine according to the invention which is shown in FIG. 1 makes it possible to achieve high-quality electrical discharge machining of workpieces due to its high mechanical stiffness, the symmetric arrangement of the guide heads 4, 5 and the elimination of sealing elements.

With respect to the arrangement of the guide heads 4, 5, the workpiece 2 as well as the X/Y and U/V drives 14, 15, the wire electrical discharge machine according to FIG. 2 corresponds to that shown in FIG. 1. However, a worktank 9 for accommodating the dielectric flushing fluid is arranged around the work space of the wire electrical discharge machine. This worktank 9 can be vertically displaced inside of the machine frame 10 by a suitable worktank drive 12. Depending on the processing status, the worktank 9 is automatically displaced upward or downward by the CNC control of the wire electrical discharge machine, e.g., to gain access to the work space so as to exchange the workpiece 2.

A lower Z drive 17 that carries the lower guide head 5 vertically extends through the bottom of the worktank 9 and is sealed relative to the bottom of the worktank 9 by a sealing element 13.

The sealing element 13, which may be realized in the form of an expansion bellows seal, hardly impairs the precision of the machine because the worktank 9 is moved only during processing breaks. In addition, a frictional force may occur only in the very stiff Z direction if the lower Z drive 17 is displaced.

With respect to the arrangement of the guide heads 4, 5, the workpiece 2 as well as the X/Y and U/V drives 14, 15, the wire electrical discharge machine according to FIG. 3 also corresponds to that shown in FIG. 1. However, a worktank 9 for accommodating the dielectric flushing fluid is provided in this case. The bottom 18 of this worktank is stationary, and its walls 19 can be vertically displaced while being sealed relative to the lateral sections of the worktank bottom 18. In this case, the movement of the worktank walls 19 is also automated with the aid of the CNC control. In addition, the lower guide head 5 is arranged so low that the guide head 5 is situated underneath the plane of the worktank bottom 18, i.e., it is practically integrated into the worktank bottom 18. The distance between the worktank bottom 18 and the lower workpiece surface is very small in this case.

Figure 4A:
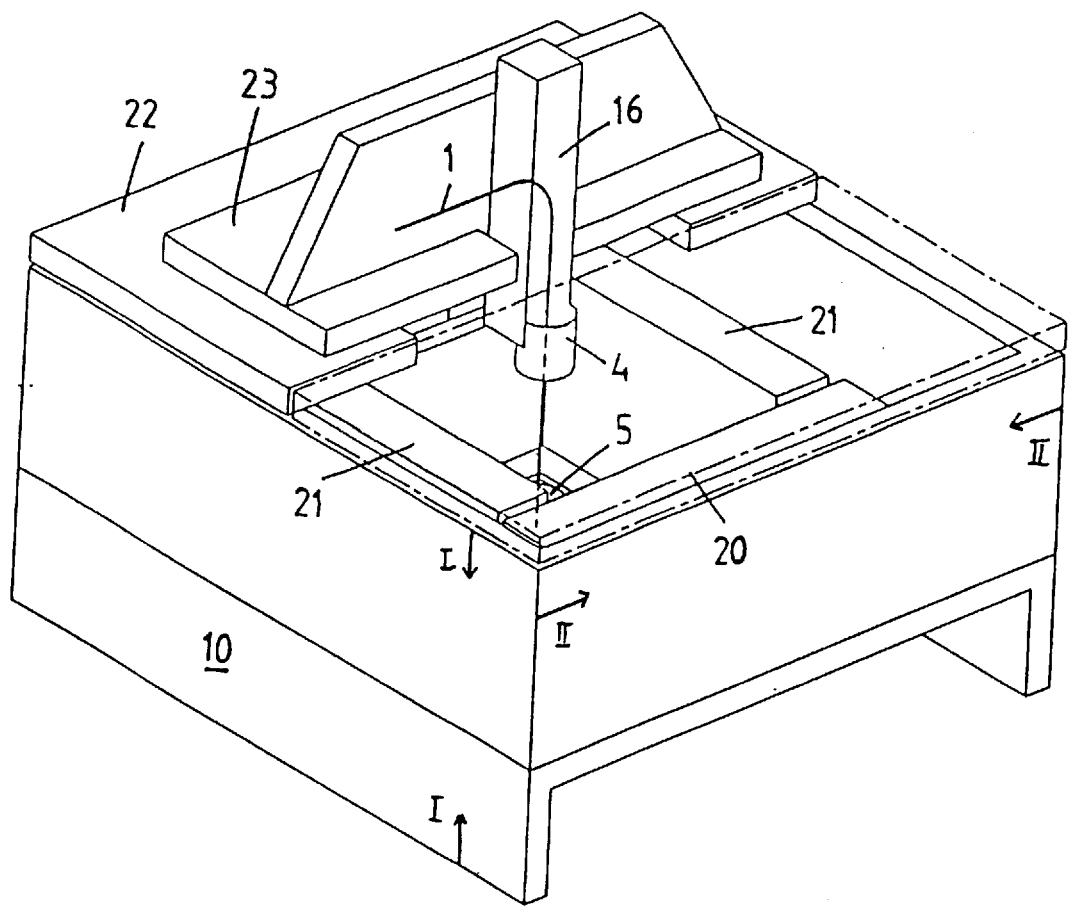
FIG. 4, a partial perspective representation of a box-like design according to the invention (FIG. 4*a*); a section through FIG. 4*a* along the line I—I (FIG. 4*b*), and a cross section through FIG. 4*a* along the line II—II (FIG. 4*c*)
Figure 4B:
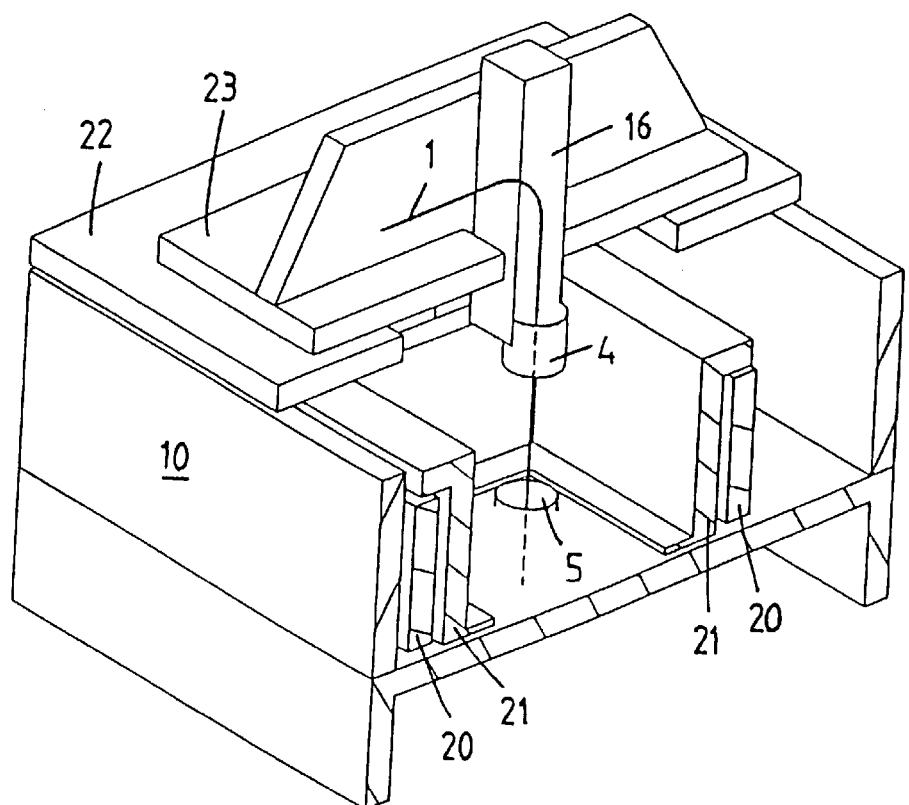
Figure 4C:
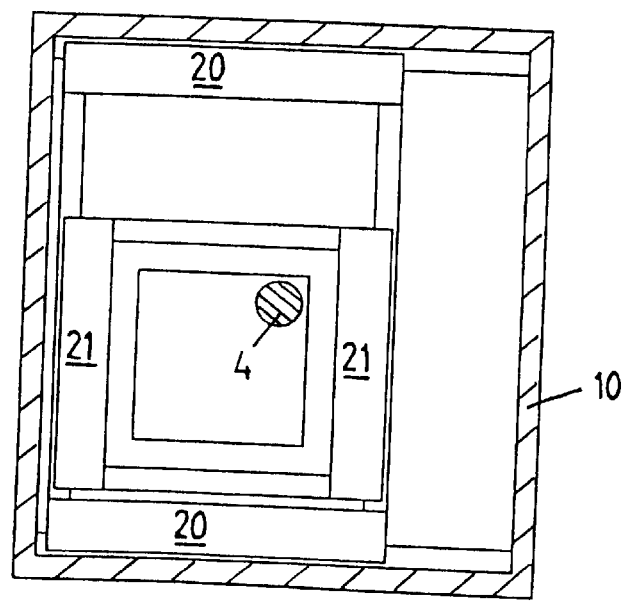

FIGS. 4a–4c show different partial views of the drive arrangement of another wire electrical discharge machine according to the invention, wherein the drive arrangement is realized in the form of a so-called framework.

FIG. 4a shows a perspective view of a 5-axis kinematics unit that consists of an X/Y main axis drive, a U/V drive as well as a Z drive and, for example, is arranged in the interior of the machine frame 10 of a wire electrical discharge machine according to FIG. 1 on the side that faces the work space.

According to FIG. 4a, the machine frame 10 that essentially has the shape of a rectangular box forms part of the drive arrangement. A frame-shaped X carriage 20 (a so-called X frame) is arranged inside of the box-shaped machine frame 10 on opposing walls by means of guiderails, namely such that the X slide 20 can be displaced in the X direction by the difference in length between the X slide frame and the machine frame. A frame-shaped Y slide 21 (a so-called Y frame) is arranged inside of the X slide 20 such that it can be displaced in the Y direction. In this case, the Y slide 21 extends over the height of the side wall of the X slide 20 which extends in the Y direction and can be displaced in the Y direction by the difference in length between the Y slide side and the X slide side. Consequently, the X slide and the Y slide 20, 21 form a Cartesian X/Y main axis drive. A workpiece to be machined or a pallet with workpieces is mounted in the interior of the Y slide 21 via suitable clamping means.

A schematically illustrated erosion wire 1 is supplied to the upper guide head 4 by a wire supply system (not shown) and guided through the work space between the upper guide head and a lower guide head 5 (only indicated in the figure) that is arranged symmetric to the upper guide head. The relative movement between the workpiece and the erosion wire 1 which defines the cutting contour is generated by the X/Y drive 20, 21 that is coupled to the workpiece. In order to displace the upper guide head 4 relative to the lower guide head 5 (conical cuts), an additional U/V drive is provided. This drive comprises a V slide 22 that is arranged on the upper edge of the machine frame 10 such that it can be displaced in the V direction. In addition, a U slide 23 that can be horizontally displaced in the U direction is arranged on the V slide 22. Consequently, the upper guide head 4 can be displaced relative to the lower guide head in the U/V plane by means of this Cartesian U/V drive. A Z drive 16 that makes it possible to vertically adjust the upper guide head 4 may be additionally coupled with the upper guide head 4.

In order to better comprehend the invention, FIG. 4b shows a lateral section along the line I—I in FIG. 4a, and FIG. 4c shows a cross section along the line II—II in FIG. 4a. Identical technical characteristics are identified by identical reference symbols.

Figure 5:
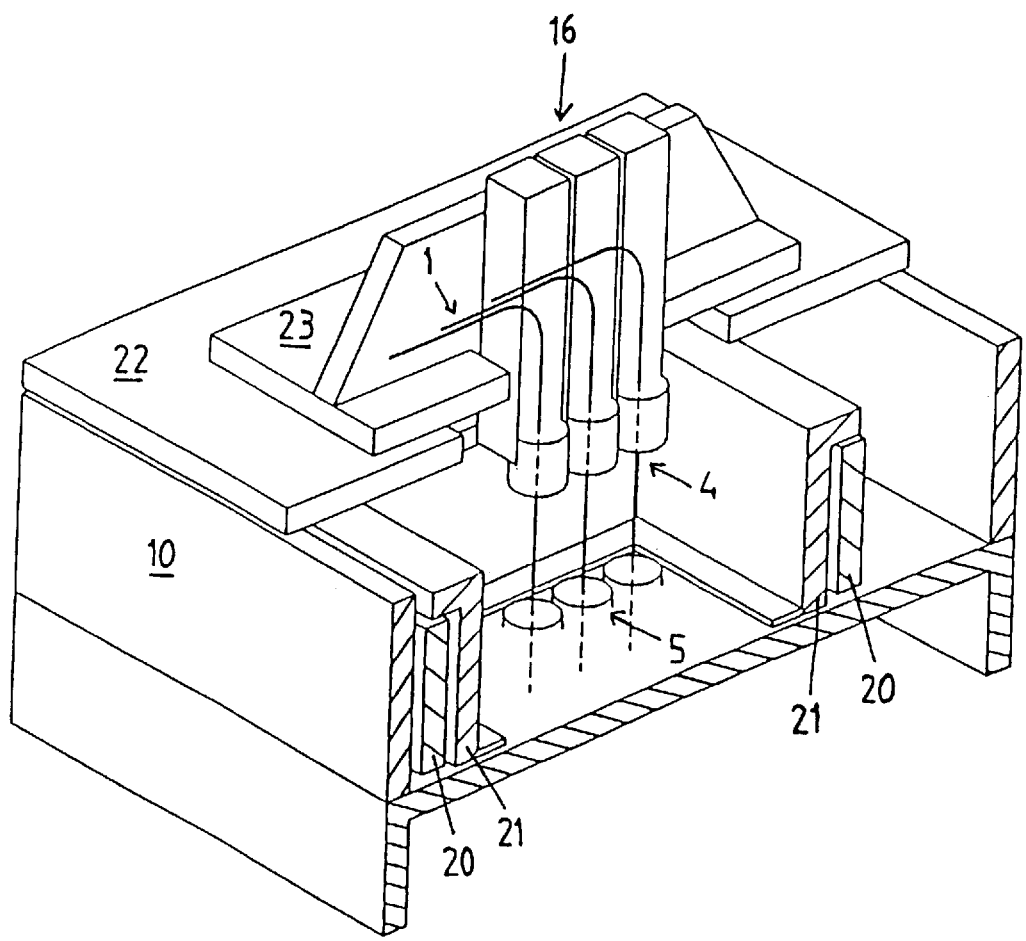
FIG. 5, a partial perspective representation of one additional box-like design of a multi-wire system according to the invention, and FIG. 6, a longitudinal section through a wire electrical discharge machine according to the state of the art.
Figure 6:
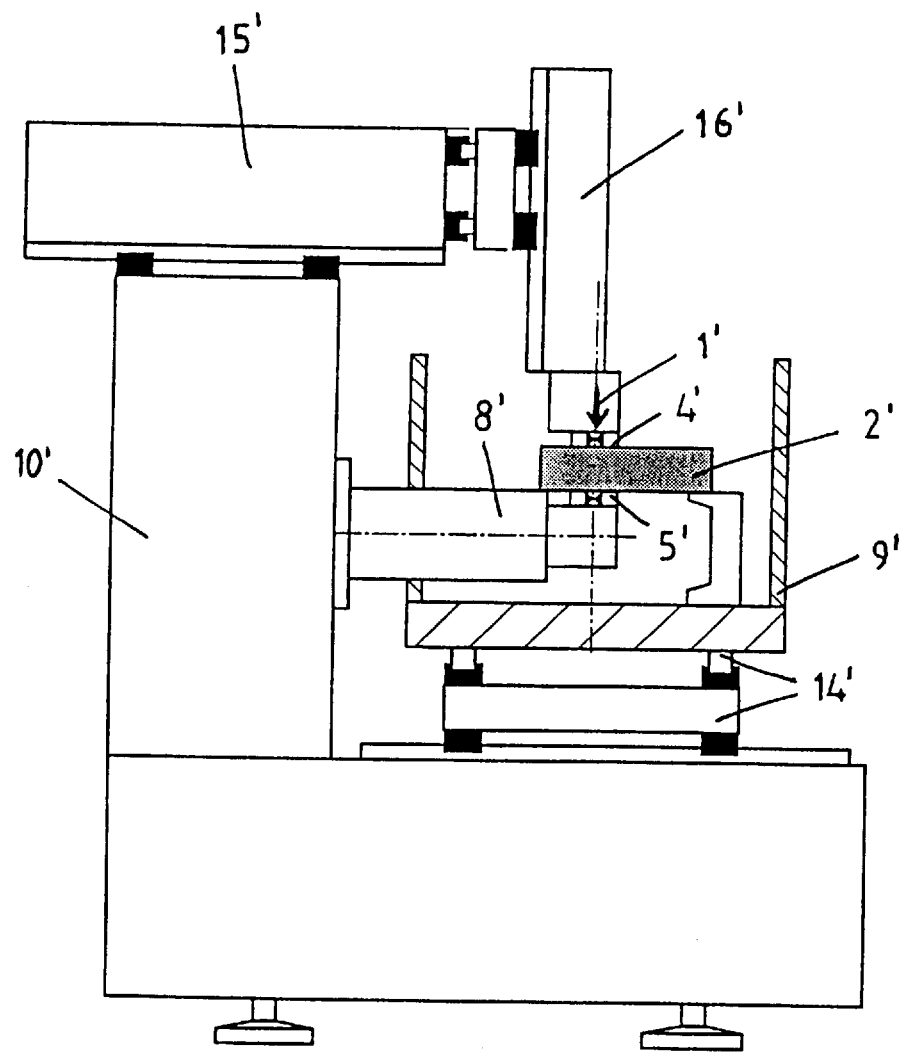

FIG. 5 shows a 7-axis arrangement, the basic design and kinematics of which corresponds to the embodiment according to FIGS. 4a–4c. However, this system is designed in the form of a multi-wire system. In this case, three upper guide heads 4 that are arranged adjacent to one another and respectively assigned to corresponding lower guide heads 5—only indicated in FIG. 5—are provided. The three upper guide heads 4 are collectively coupled with the U slide 23 of the U/V drive such that they can be collectively displaced relative to the three lower guide heads 5 in the U/V direction. Each upper guide head 4 is additionally equipped with a Z drive 16 in order to realize the height adjustment in the Z1, Z2 or Z3 direction. While processing a workpiece by means of electrical discharge machining, one or more upper guide heads 4 protrude into the Y slide of the proposed frame-shaped drive kinematics unit.

Such a multi-electrode system makes it possible to produce several erosion contours on the same workpiece or different workpieces simultaneously or to produce several erosion contours on the same workpiece or different workpieces successively, e.g., at different erosion points.

In addition, it is possible to erode several very precisely positioned start bores successively or simultaneously. This represents a particularly important aspect for the field of microscopic-scale machinings, e.g., for spinning nozzles, in which the diameter of the start hole frequently needs to be only slightly larger than the cutting width of the subsequent wire electrical discharge machining process.

We claim:

1. A method for processing workpieces by electric discharge machining, with at least one electrode which is guided in guide heads above and below the working zone, said method comprising the steps of:
    a) providing a workpiece;
    b) providing an electric discharge machine having at least one electrode, a machine frame, a worktank for containment of machining fluid, an upper guide head and a lower guide head, said frame, said worktank, and said lower guide head forming a stationary unit with respect to a horizontal X/Y main axis, said lower guide head passing through a bottom of the worktank;
    c) providing an X/Y main drive for moving said workpiece in a horizontal X/Y plane;
    d) moving said workpiece in the X/Y plane; and
    e) simultaneously eroding said workpiece with said at least one electrode.

2. The method according to claim 1, wherein the said upper guide head of said electric discharge machine also forms part of the stationary unit with respect to the horizontal X/Y axis.

3. The method according to claim 1, wherein said electric discharge machine further comprises a Z drive for moving said upper guide head in a vertical Z direction, and a U/V drive for moving said upper guide head in horizontal U/V directions.

4. The method according to claim 1, wherein said electric discharge machine further comprises a Z drive for moving said lower guide head in a vertical Z direction.

5. The method according to claim 1, wherein said worktank has a plurality of sides that are movable with respect to said bottom.

6. The method according to claim 1, wherein said X/Y main axis drive comprises a first axis frame and a second axis frame, said first axis frame supported on said machine frame and having guidances, said second axis frame supported on said first axis frame perpendicular thereto and having guidances, said second axis frame further having a clamping means for clamping the workpiece.

7. An apparatus for processing workpieces by electrical discharge machining, with at least one processing electrode, wherein a workpiece is moved in horizontal X/Y main axis directions and simultaneously eroded by at least one processing electrode, said apparatus comprising:

a machine frame, a worktank supported by said machine frame, said worktank configured for containing a machining fluid and having a bottom and a plurality of sides, an upper guide head and a lower guide head for guiding the at least one processing electrode, said guide heads supported by said machine frame;

an X/Y main drive for moving the workpiece in the X/Y main axis directions;

said frame, said worktank, and said lower guide head forming a stationary unit with respect to the horizontal X/Y axis, said lower guide head passing through said bottom of said worktank.

8. The apparatus according to claim 7, wherein said upper guide head also forms part of the stationary unit with respect to the horizontal X/Y axis.

9. The apparatus according to claim 7, further comprising a Z drive for moving said upper guide head in a vertical Z direction, and a U/V drive for moving said upper guide head in horizontal U/V directions.

10. The apparatus according to claim 7, further comprising a Z drive for moving said lower guide head in a vertical Z direction.

11. The apparatus according to claim 7, wherein said plurality of sides of said worktank are movable with respect to said bottom.

12. The apparatus according to claim 7, wherein said X/Y main axis drive comprises a first axis frame and a second axis frame, said first axis frame supported on said machine frame and having guidances, said second axis frame supported on said first axis frame perpendicular thereto and having guidances, said second axis frame further having a clamping means for clamping the workpiece.

* * * * *